United States Patent [19]

Sheu

[11] Patent Number: 5,752,745
[45] Date of Patent: May 19, 1998

[54] WHEEL RIM COVER CLASP

[75] Inventor: Lih-Ching Sheu, Tainan Hsien, Taiwan

[73] Assignee: Kuan Hsieng Industrial Co., Ltd., Tainan, Taiwan

[21] Appl. No.: 763,058

[22] Filed: Dec. 10, 1996

[51] Int. Cl.⁶ ..................................... B60B 7/12
[52] U.S. Cl. ........................ 301/37.32; 301/37.34
[58] Field of Search ........................ 301/37.1, 37.31, 301/37.32, 37.33, 37.34, 37.35, 37.36, 37.39, 37.42

[56] References Cited

FOREIGN PATENT DOCUMENTS

| 3809480 | 10/1989 | Germany | 301/37.33 |
| 2279101 | 12/1987 | Japan | 301/37.33 |
| 4090802 | 4/1989 | Japan | 301/37.33 |
| 3005204 | 1/1991 | Japan | 301/37.33 |

Primary Examiner—Russell D. Stormer
Attorney, Agent, or Firm—Panitch Schwarze Jacobs & Nadel, P.C.

[57] ABSTRACT

A wheel rim cover clasp includes an upper clasp body having a support seat, the support seat having a first end and a second end. The upper clasp further includes an insertion seat formed at the first end of the support seat, hinge pins proximate to the second end of the support seat and a lock section. The cover clasp also includes a lower clasp body joined to the upper clasp body by the hinge pins of the support seat. The lower clasp body has two backing seats, each backing seat having a first end and a second end. A fastener seat extends from the first end of each backing seat, a stop seat extends from the second end of each backing seat and projecting in the same direction as the fastener seat, and a fastener slot is formed between each fastener seat and the corresponding stop seat.

5 Claims, 4 Drawing Sheets

5,752,745

1

WHEEL RIM COVER CLASP

BACKGROUND OF THE INVENTION

1. Field of the Invention

The invention herein relates to a kind of wheel rim cover clasp, specifically referring to kind of clasp that can be conveniently latched into the mounting holes of mounting bases on a wheel rim cover. At the same time, the bodies of the clasps are fabricated as components that can be disassembled such that the clasps, in addition to reducing the packaging height of stacked wheel rim covers, also allows installation onto the wheel rim covers to skew as well as decrease the height of wheel rim covers piled into stacks.

2. Description of the Related Art

Conventional compact car tires all utilize wheel covers installed between the steel rim and tires to cover and embellish the exterior of the tires and wheels. Traditionally called wheel covers, the term inclusively refers to both wheel rim and wheel spoke covers. Of these, the wheel rim cover, as indicated in FIG. 1, utilizes engraved holes (12) on the cover surface (11) of the wheel rim cover (1) near the outer circumference to enhance aesthetics and heat dissipation. On the rear side of the cover surface (11), as indicated in FIG. 2, the clasp structure mainly consists of a ring of mounting bases (2) positioned with a number of clasps (21) arranged at suitable intervals apart. Each clasp (21) is surrounded in between by spring coils (3) and the clasps (21) of the wheel rim cover (1), wherein the clasps (21) of the wheel rim cover (1) are utilized, under the exertion of the spring coil (3), for insertion onto the outer circumference of the vehicle tire and rim to effectively achieve embellishment.

Regarding the structural portion of the wheel rim cover, the inventor of the invention herein has designed the structure shown in FIG. 3, which mainly consists of clasps (22) and mounting bases (23) that are discretely formed, and on the mounting bases (23) are fastening holes (24); at the same time, the support sections (25) at the curved ends of the clasps (22) can be inserted into the fastening holes (24) of the mounting bases (23), and the surrounding sections (27) formed outside the hook sections (26) at the ends of the clasps (22), in addition to enabling the support sections (25) of the clasps (22) to be inserted into mounting bases (23), also enables the inner end sections (271) of the surrounding sections (27) to be inserted onto the annular edges (28) of the mounting bases (23), which thereby enables the mounting of the clasps (22).

In the design of the discretely formed clasps and mounting bases, since the clasps can be separately packaged, packaging material area is not occupied on the wheel rim cover. However, although there is the advantage of consuming less packaging material than non-discrete clasps, if separate packing processes could be similarly economized, then overall production efficiency will be increased.

SUMMARY OF THE INVENTION

The objective of the invention herein is to provide an improved wheel rim cover that is fabricated by bending, and includes an upper clasp body and a lower clasp body. Of which, the aforesaid upper clasp body has an insertion seat formed at the upper extent of the support seat, and hinge pins at the lower extent of the support seat and, furthermore, has a lock section. The aforesaid lower clasp body is conjoined to the aforesaid upper clasp body on the hinge pins at the lower extent of the support seat, and which has two backing seats, and extending from the lower extent of each backing seat is a fastener seat, and at the lower extent of each backing seat and curving forward in the same direction of the fastener seat is a stop seat, and formed in between the aforesaid fastener seat and the stop seat is a fastener slot. By mounting the lower clasp body onto the wheel rim cover, the upper clasp body can at the same time be rotated upward when necessary to reduce the height of the clasps and thereby save the total amount of wheel rim cover packaging material.

BRIEF DESCRIPTION OF THE DRAWINGS

Additional features and advantages of the invention herein will become apparent in the following detailed description of the preferred embodiments, with reference to the accompanying drawings, wherein.

DETAILED DESCRIPTION OF THE PREFERRED EMBODIMENTS

In the detailed description of the preferred embodiments of the invention herein, similar elements are indicated by the same reference numbers throughout the disclosure.

Figure 1:
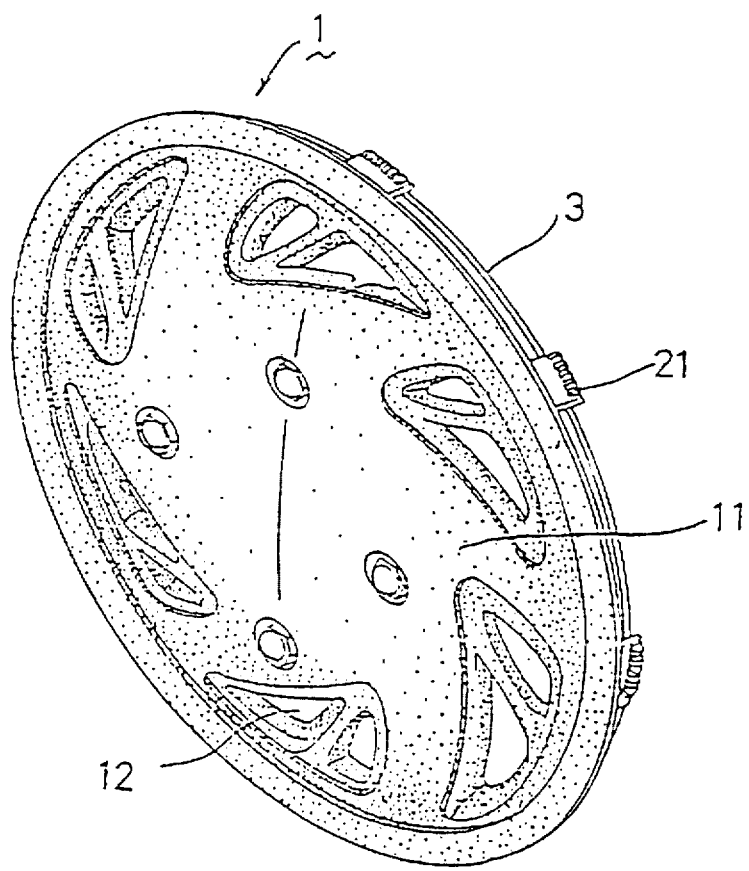
FIG. 1 is an isometric drawing of the conventional wheel rim cover.
Figure 2:
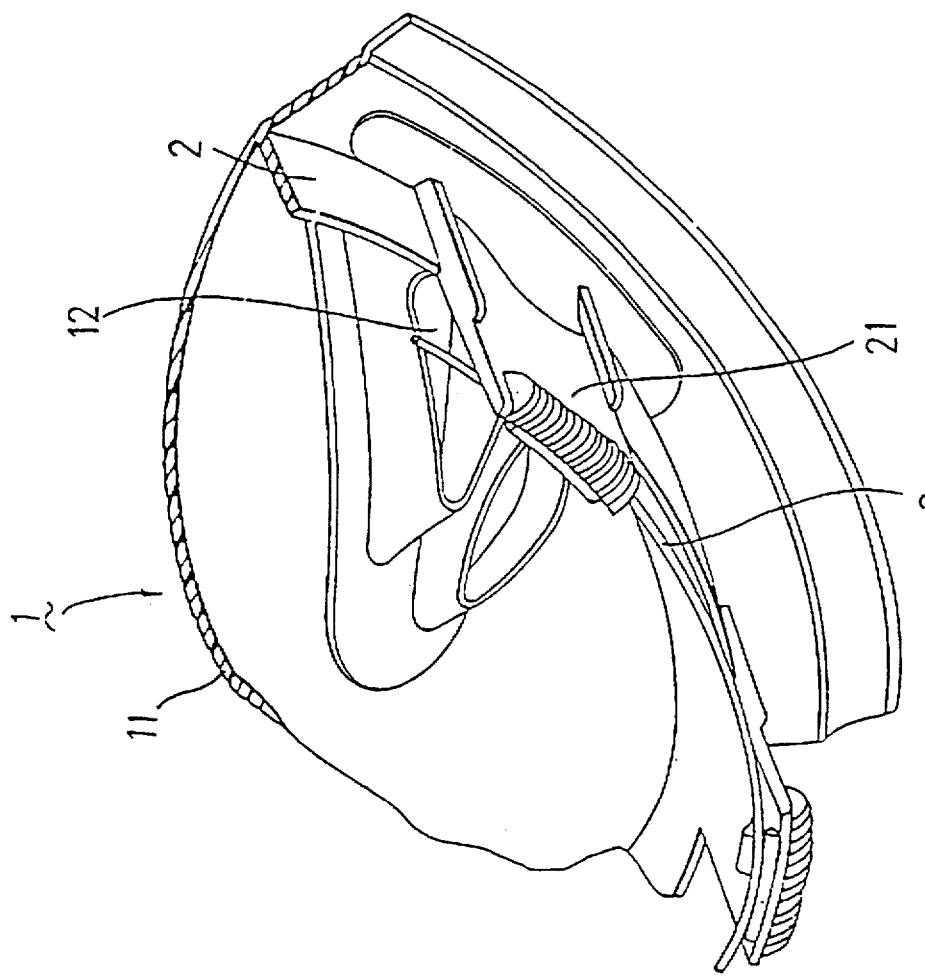
FIG. 2 is an isometric drawing of the conventional wheel rim cover structure.
Figure 3:
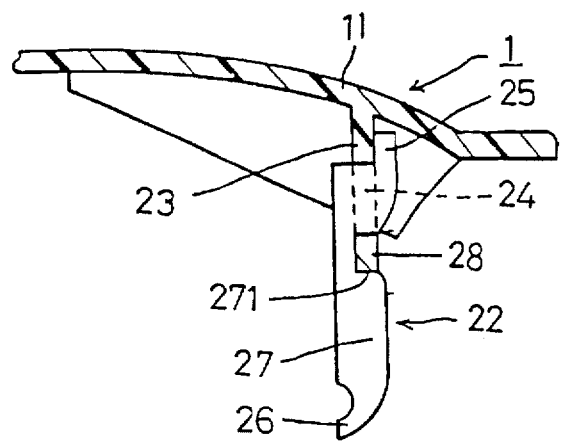
FIG. 3 is an exploded drawing of the conventional wheel rim cover structure.
Figure 4:
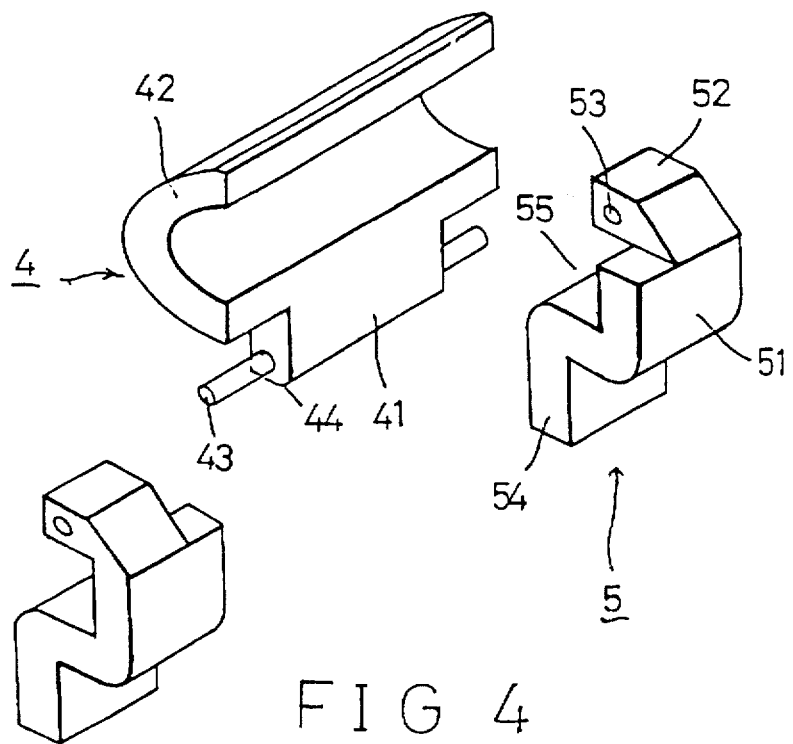
FIG. 4 is an isometric drawing of the first preferred embodiment of the invention herein.

Referring to FIG. 4, the clasp of the first preferred embodiment of the wheel rim cover clasp invention herein is fabricated by bending and the integral clasp includes the upper clasp body (4) and the lower clasp body (5). Of which, the aforesaid clasp body (4) has a support seat (41) and, furthermore, formed at the upper extent of the support seat (41) is an insertion seat (42) that provides for the insertion of the spring coil found on conventional wheel rim covers, and the two ends of the lower extent of the support seat (41) are hinge pins (43), and at the lower end of the support seat (41) is a lock section (44). The aforesaid lower clasp body (5) includes two backing seats (51), and extending laterally from each backing seat (51) is a fastener seat (52) and, furthermore, on the fastener seat (52) is a shaft hole (53). At the lower extent of each backing seat (51) and curving forward in the same direction of the fastener seat (52) is a stop seat (54), and formed in between the aforesaid fastener seat (52) and the stop seat (54) is a fastener slot (55).

Figure 5:
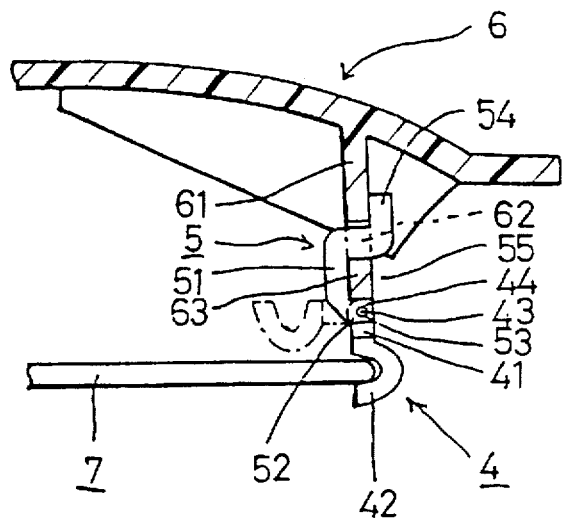
FIG. 5 is an application drawing of the first preferred embodiment of the invention herein.
Figure 6:
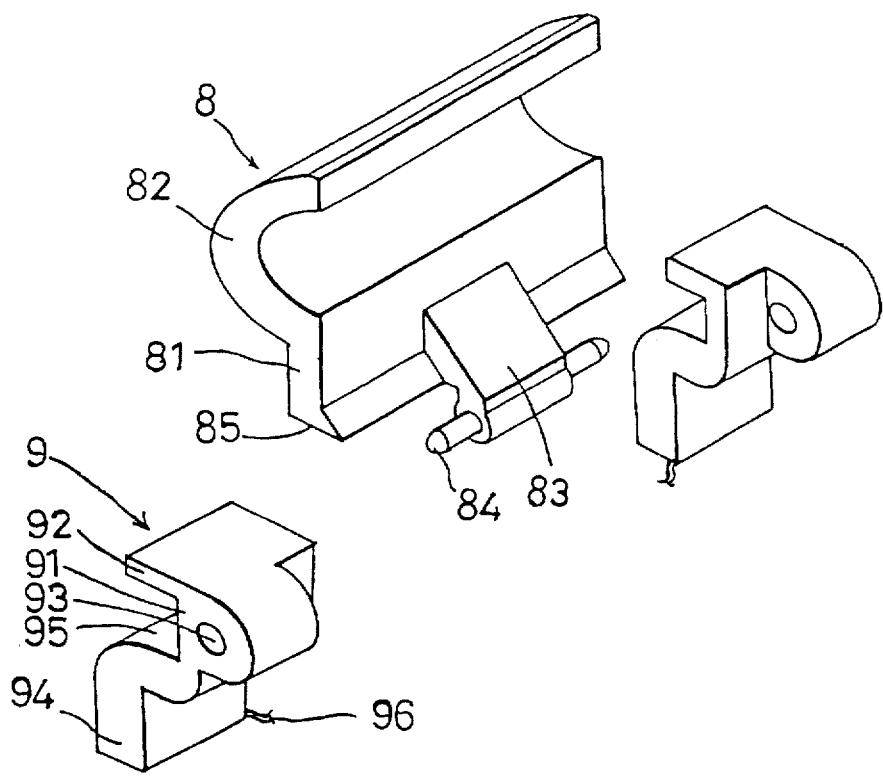
FIG. 6 is an isometric drawing of the second preferred embodiment of the invention herein.

Referring to FIG. 5, in assembly, the hinge pins (43) on the support seat (41) of the clasp body (4) are inserted into the shaft holes (53) in each of the fastener seats (52) of the two backing seats (51) on the lower clasp body (5) to assemble the clasp into an integral unit, and when the aforesaid assembled clasp is installed onto the wheel rim cover, the stop seat (54) of the lower clasp body (5) is first extended through the mounting hole (62) of the mounting base (61) on the wheel rim cover (6) and then pushed to the backing seats (51) of the lower clasp body (5), which enables the backing seats (51) to be held stationary against the side of the mounting base (61), while also enabling the insertion of the annular edge (63) of the mounting base (61)

into fastener slot (55) of the lower clasp body (5) and, furthermore, causing the fastener seats (52) to become inserted onto the aforesaid annular edge (63) and, as such, the entire lower clasp body (5) is firmly mounted onto the mounting base (61). The upper clasp body (4) is later then pulled upwards, which causes, when the lock section (44) at the rear end of the support seat (41) is engaged onto the annular edge (63) of the mounting base (61) on the wheel rim cover, the upper clasp body (4) to rotate rearward and become immobilized and, furthermore, become aligned along the same axis as the lower clasp body (5). As such, after all the clasps are installed onto the each of the mounting bases (61) on the wheel rim cover (6), a spring coil (7) is inserted into the insertion seat (42) in the upper clasp body (4) of the clasp, which results in a completely assembled clasp that can be installed onto the wheel rim cover (6) of the steel vehicle rim.

Furthermore, when the entire wheel rim cover (6) is packaged, the wheel rim cover (6) can be pre-packaged with each clasp already installed, wherein the upper clasp body (4) is rotated downward into place, as indicated in FIG. 5, along the hypothetical line shown. As such, one aspect of consideration is that since each of the clasps remain mounted on the wheel rim cover (6), therefore, the entire integral unit is easily packaged and emplaced. Another aspect is that since the height occupied by the upper clasp body (4) is lowered when packaged, therefore, the overall quantity of packaging materials can be saved and thereby greatly reduce shipping costs.

Referring to FIG. 5, the upper clasp body (8) of another embodiment of the invention herein has a support seat (81) and, furthermore, formed at the upper extent of the support seat (81) is an insertion seat (82) provides for the inserting of the spring coil found on conventional wheel rim covers; extending from the support seat (81) is a hinge joint base (83) and at each of the two ends of the hinge joint base (83) is a hinge pin (84), and at the lower end of the support seat (81) is a lock section (85). Furthermore, the lower clasp body (9) includes two backing seats (91) and extending laterally from the upper extent of each backing seat (91) is fastener seat (92) and, furthermore, on the backing seat (91) is a shaft hole (93). At the lower extent of each backing seat (91) and curving towards the fastener seat (92) is a stop seat (94), and formed in between the aforesaid fastener seat (92) and the stop seat (94) is a fastener slot (95).

Conjoining the two stop seats (94) to the lower clasp bodies (9) is a connector (96), and the aforesaid connector (96) normally enables the two lower clasps bodies (9) to resist easy dislodging, and in assembly, the hinge pins (84) of the hinge joint base (83) on the upper clasp body (8) are inserted into the shaft holes (93) in each of the two backing seats (91) on the lower clasp bodies (9) to assemble the clasp into an integral unit, and when the aforesaid assembled clasp is installed onto the wheel rim cover as indicated in FIG. 5, the stop seat (94) of the lower clasp body (9) is first extended through the mounting hole (62) of the mounting base (61) on the wheel rim cover (6), and then pushed to the backing seats (91) of the lower clasp body (9), which enables the backing seats (91) to be held stationary against the side of the mounting base (61), while also enabling the insertion of the annular edge (63) of the mounting base (61) into fastener slot (95) of the lower clasp body (9) and, furthermore, causing the fastener seats (92) to become inserted onto the aforesaid annular edge (63) and, as such, the entire lower clasp body (9) is firmly mounted onto the mounting base (61). The upper clasp body (8) is later then pulled upwards, which causes, when the lock section (85) at the rear end of the support seat (81) is engaged onto the fastener seat (92) of the lower clasp body (9), the upper clasp body (4) to rotate rearward and become immobilized.

While the invention herein has been described in relation to what is considered the most practical and preferred embodiments, the invention herein shall not limited to the disclosed embodiments in that the intention is to cover the various interpretations included within the principles and scope of the broadest interpretations and equivalent configurations thereof.

What is claimed is:

1. A wheel rim cover clasp comprising:

an upper clasp body having a support seat, the support seat having a first end and a second end, an insertion seat formed at the first end of the support seat, hinge pins proximate to the second end of the support seat and a lock section; and a lower clasp body joined to the upper clasp body by the hinge pins of the support seat the lower clasp body having two backing seats, each backing seat having a first end and a second end, a fastener seat extending from the first end of each backing seat a stop seat extending from the second end of each backing seat and projecting in the same direction as the fastener seat, and a fastener slot formed between each fastener seat and the corresponding stop seat.

2. The wheel rim cover clasp as recited in claim 1 wherein the upper clasp body further includes a hinge joint base extending from the support seat, the hinge pins being disposed on said hinge joint base.

3. The wheel rim cover clasp as recited in claim 1 wherein each of the backing seats of the lower clasp body has a shaft hole and the hinge pins on the support seat of the upper clasp body are inserted into the shaft hole of a separate backing seat to hinge the upper clasp body to the lower clasp body.

4. The wheel rim cover clasp as recited in claim 1 wherein each of the fastener seats of the lower clasp body have a shaft hole and the hinges pins on the support seat of the upper clasp body are inserted into the shaft hole of a separate fastener seat to hinge the upper clasp body to the lower clasp body.

5. The wheel rim cover clasp as recited in claim 1 further comprising a connector joining together the two stop seats of the lower clasp body.

* * * * *